Feb. 13, 1968   R. DE VOGHEL   3,368,825
VEHICLE

Filed July 8, 1965   6 Sheets-Sheet 1

INVENTOR
Raymond de Voghel
BY
Spencer & Kaye
ATTORNEYS

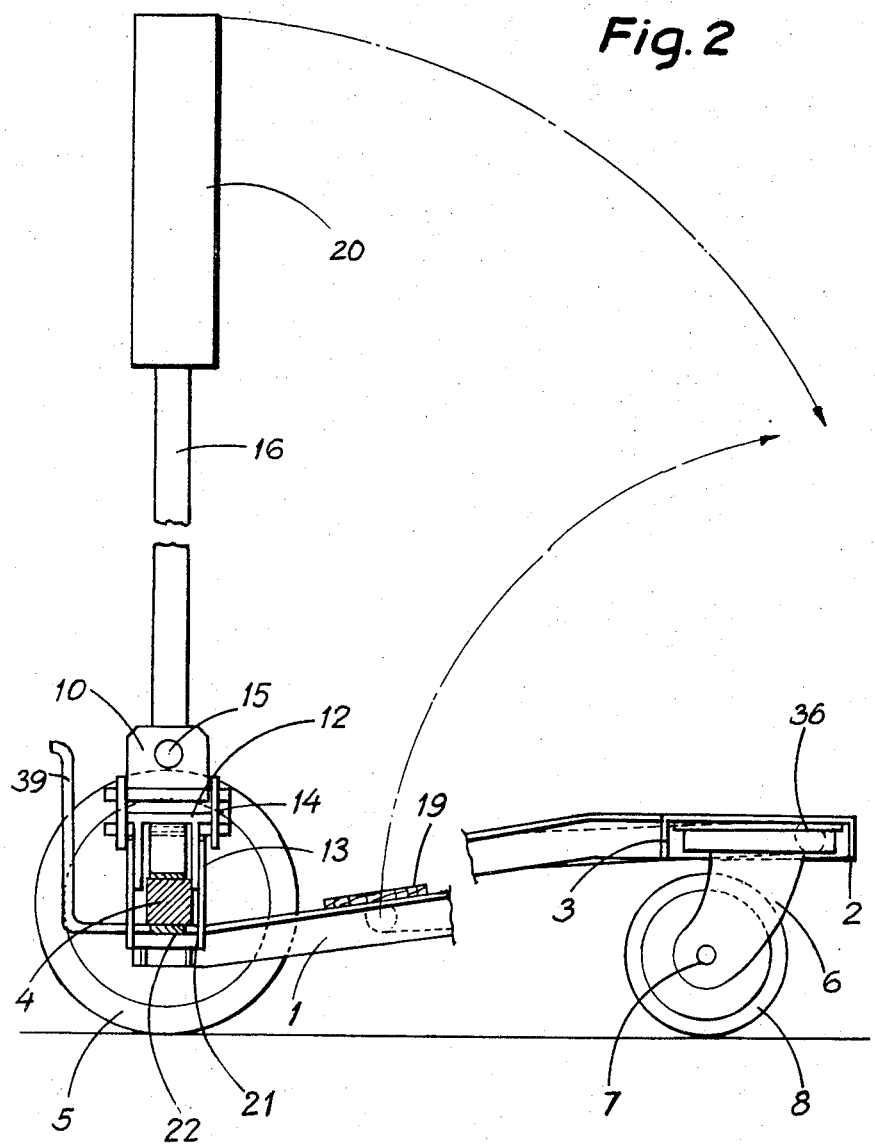

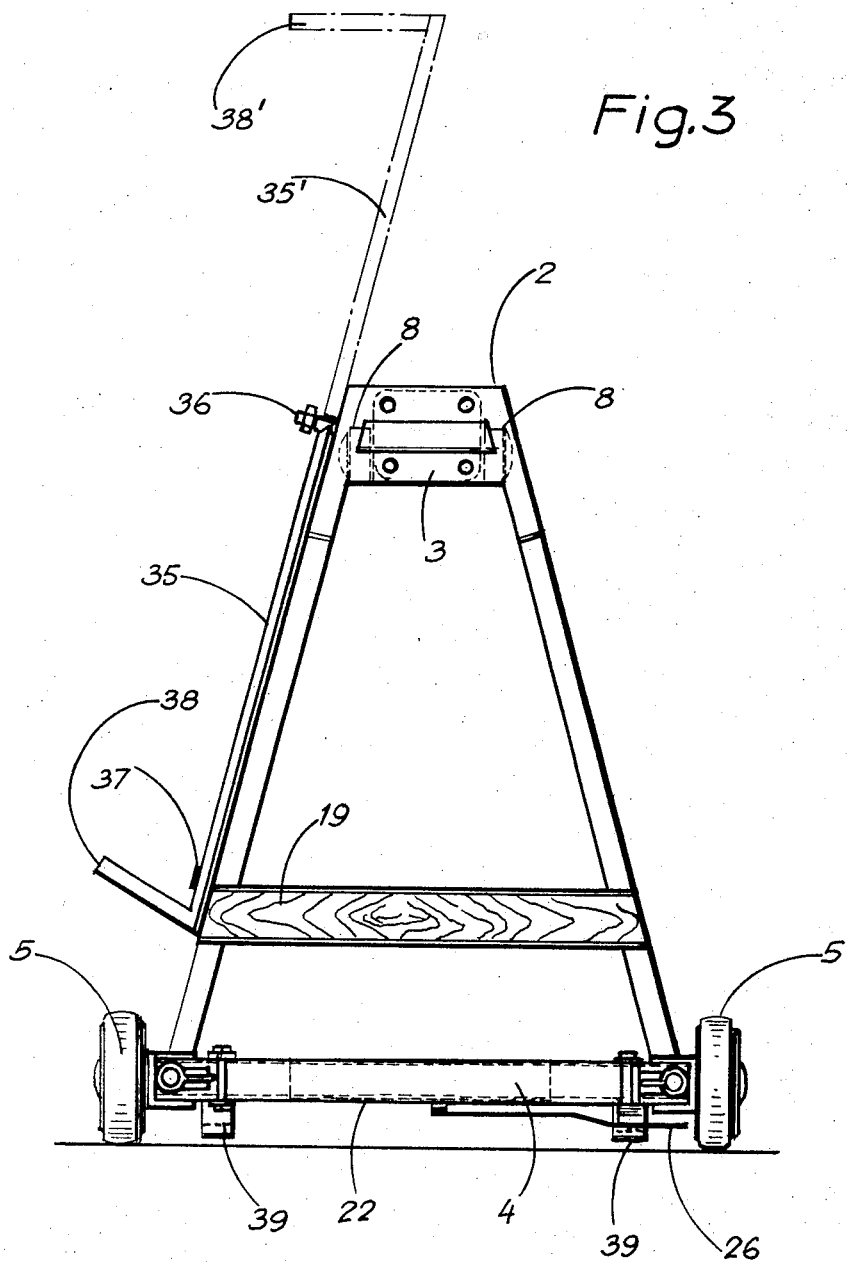

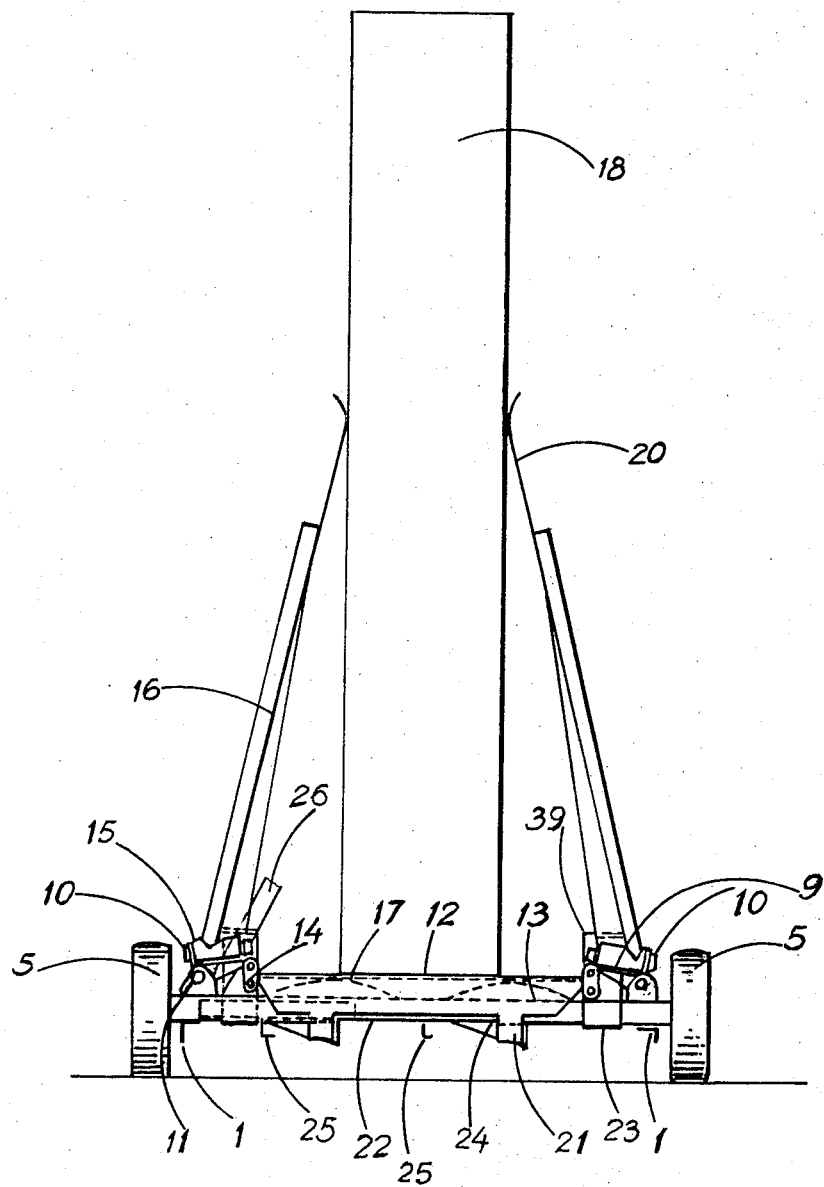

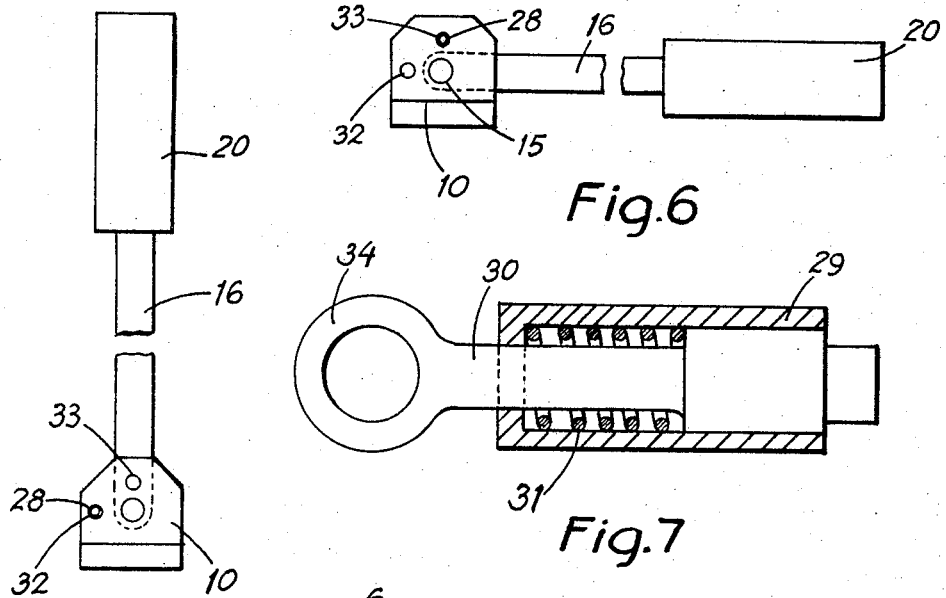
Fig.6
Fig.7
Fig.5
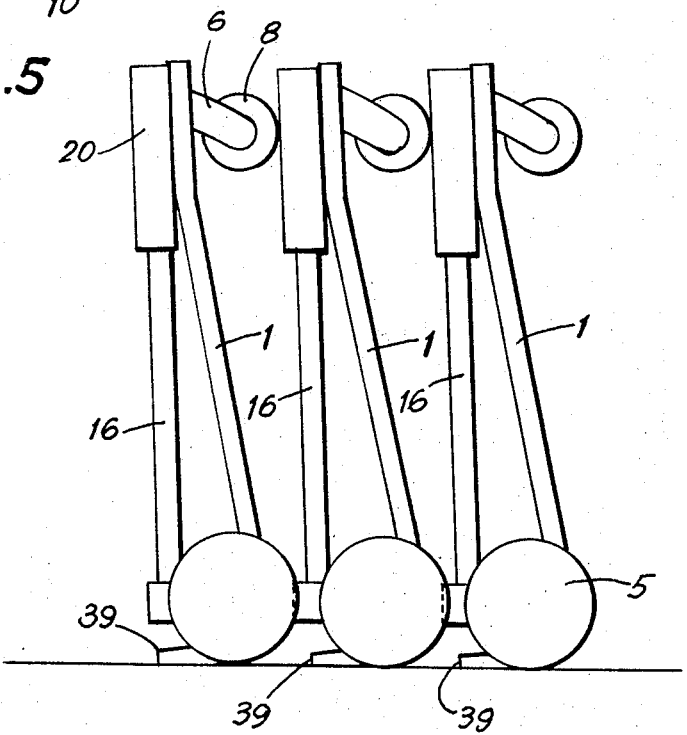
Fig.10

Feb. 13, 1968  R. DE VOGHEL  3,368,825
VEHICLE
Filed July 8, 1965  6 Sheets-Sheet 6

INVENTOR
Raymond de Voghel
By
Spencer & Kaye
ATTORNEYS

United States Patent Office 3,368,825
Patented Feb. 13, 1968

3,368,825
VEHICLE
Raymond de Voghel, Marcinelle, Belgium, assignor to Glaverbel S.A., Watermael-Boitsfort, Belgium
Filed July 8, 1965, Ser. No. 470,457
Claims priority, application Luxembourg, July 10, 1964, 46,497
8 Claims. (Cl. 280—144)

ABSTRACT OF THE DISCLOSURE

Apparatus for supporting tall objects in an upright position, which apparatus includes a pair of levers pivotally connected in such a way that when a load is being supported, its weight acts on one arm of each lever so as to cause the free end of the other arm of each lever to move in a generally horizontal direction and to bear against the sides of the load.

Figure 1:
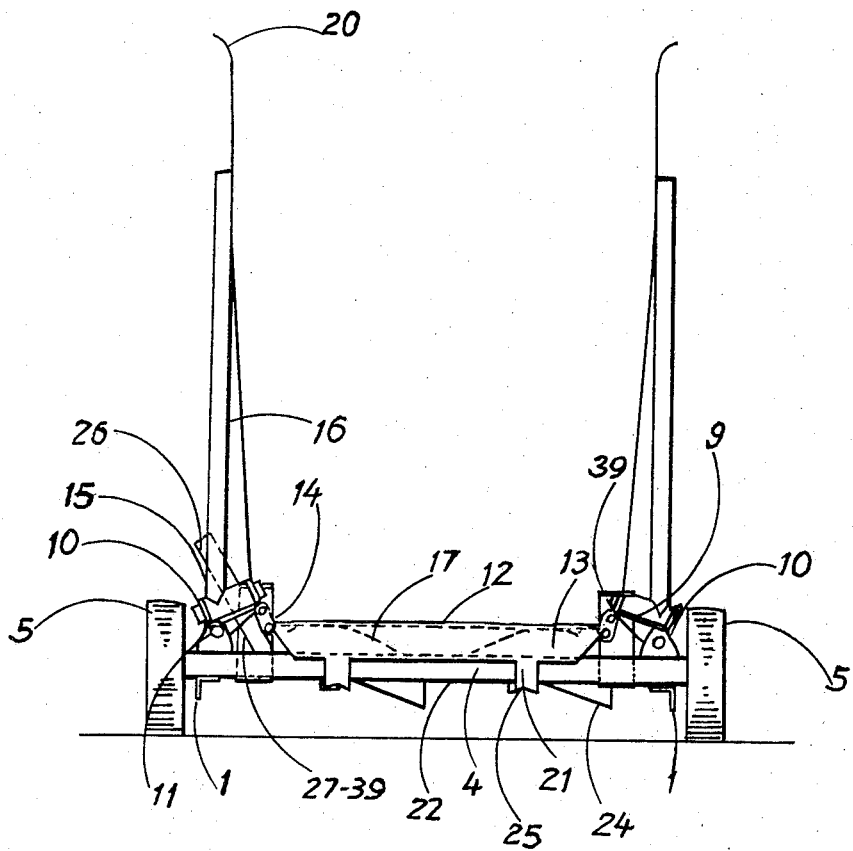

The present invention relates generally to the vehicle art, more particularly, to vehicles used for carrying tall, narrow objects which are automatically stabilized on the vehicle, such objects being cases containing glass sheets, prefabricated building panels, metal sheets, ornamental plates, etc.

Tall narrow objects can only be safely transported when the load is stabilized during their transporting movement. This is mainly necessary when they are transported over short distances in congested places and in narrow passages, particularly inside factories or workshops and storehouses or other working places.

In the glass manufacturing industry for example, the large boxes and cases containing glass sheets are transported upright by means of trucks and require several workers to retain these sheets in a correctly equilibrated state. Despite these elaborated and expensive precautions however, it occurs not infrequently that the box topples over and consequently the glass sheets break sometimes causing very serious accidents and always causing unnecessary expense.

Vehicles which are provided with tall sidewalls are available but are no longer used in workshops or storehouses because they require a great deal of space. Furthermore, they are also not used because the loading and unloading of such vehicles requires a great deal of manual labor particularly for leveling or adjusting the load between the sidewalls.

Other types of vehicles are so constructed that after loading them the load is tilted in an attempt to reducing the risk of the load becoming unbalanced or disequilibrated. However, the load must then be set upright before unloading the vehicle. This requires a second movement of the load and does not eliminate the risks, for example, that the load will become unbalanced. Such vehicles are necessarily wide at their bases. Furthermore, such a vehicle consumes a great deal of floor space and is difficult to operate in storehouses or workshops.

With this in mind, the main object of the present invention is to provide a vehicle of the character described which eliminates the disadvantages of prior devices.

It is another object of the invention to provide a vehicle which is particularly suitable for carrying tall, narrow loads, for example, loads which are introduced into dense traffic areas in which economical and safe transportation is essential.

A further object of the invention is to provide a vehicle which occupies a rather small amount of floor space when the vehicle is used for transportation purposes and which is reduced when the vehicle is placed into circulation without any load or when it is kept in reserve or storage, for example at feeding stations of a transportation network.

These objects and other ancillary thereto are accomplished in accordance with preferred embodiments of the invention wherein the vehicle for carrying tall, narrow objects and which provides for automatic stabilization includes at least one pair of V-shaped levers whose approximately vertical stabilizing arms, one for each lever, can pivot toward each other about their respective fulcrums from a position which is nearly vertical and vice versa. The other arms are supporting arms and are provided with means at their ends for supporting the load to be carried. These means are such that the vertical force which is represented by the load is converted into two opposite horizontal forces which move the ends of the stabilizing arms closer together against the sides of the load.

When such vehicle is used, for example in the glass manufacturing industry, as soon as an empty box to be used on the vehicle is placed into circulation it is associated with the vehicle as if it were a part of it. The vehicle carries the load in a well stabilized fashion to the packing shop and, after the empty box has been filled, to the storeroom or the loading platform.

Figure 8:
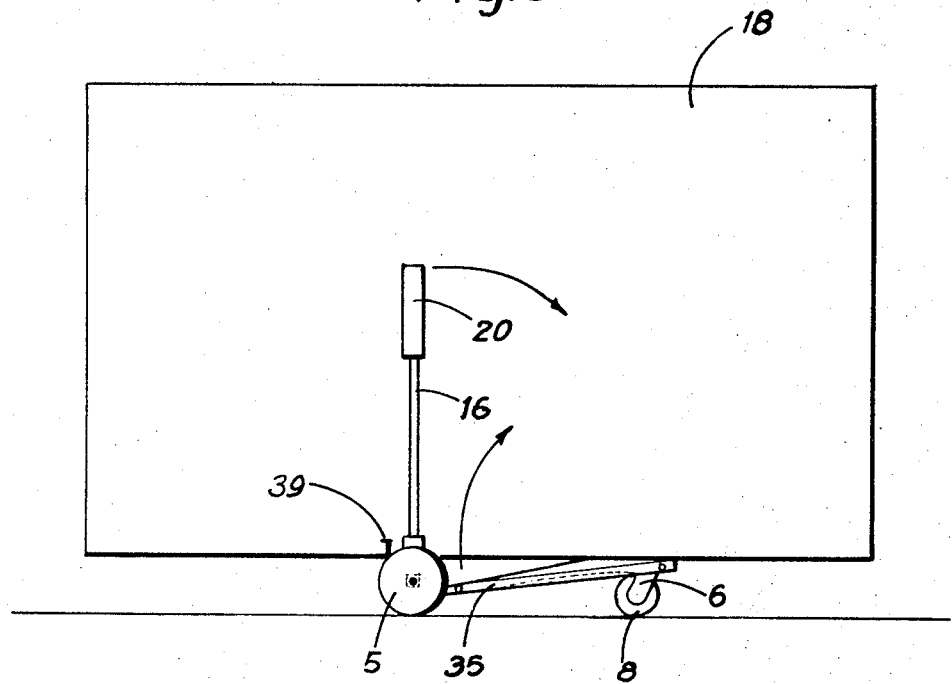
Figure 9:
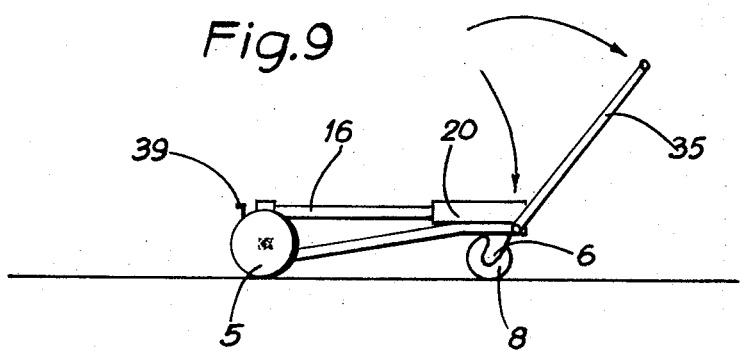

Additional objects and advantages of the present invention will become apparent upon consideration of the following description when taken in conjunction with the accompanying drawings in which:

FIGURE 1 is a front elevational view of the present invention.
FIGURE 2 is a side elevational view, partly in section.
FIGURE 3 is a plan view.
FIGURE 4 is a view similar to FIGURE 1 illustrating the vehicle loaded, with the load stabilized.
FIGURE 5 is a detailed elevational view illustrating the lock for the arms locked in position.
FIGURE 6 is a detailed elevational view illustrating the arms locked in their collapsed or out-of-use position.
FIGURE 7 is an enlarged sectional view illustrating the device for locking the arms.
FIGURE 8 is a side elevational view illustrating the invention carrying a load.
FIGURE 9 is a side elevational view illustrating the vehicle with the arms tilted back and the draft bar extended for operating the vehicle with no load.
FIGURE 10 is a side elevational view illustrating three vehicles stored.

With more particular reference to the drawings, an example of the present invention is shown in FIGURES 1, 2, 3, and 4 wherein a trapezoidal chassis is provided, in which the sides 1 and the small base 2 are formed of angle irons. An additional angle iron 3 is fixed to both sides 1 and extends parallel to the small base. The larger base of the trapezoid is formed by an axle 4 which has a square cross section and which is rigid with the angle iron 1. Carrying wheels 5 are provided at the ends of the axle.

A fork 6 mounted for free swiveling movement is connected to the angle irons 2 and 3, and carries the wheels 8 on a swivel axle 7. Flat iron members 9, each constituting the supporting arm of a respective V-shaped lever, have their ends 10 bent at right angles to the central or bight portion to thereby form U-shaped members, mounted upon bearings 11 by one of their respective angles near the wheels 5. As may be seen from FIGURE 1, the cross-sectional plane of the U formed by each member 9 is at right angles to the axis of its associated bearing 11. A bridge member 12 is provided which is an inverted U-shaped iron member having flanges 13 which are slidably disposed vertically on both sides of the axle 4. This bridge member 12 is connected at the other angles of the respective members 9 by means of connecting rods 14.

Pins 15 are pivotably mounted in flanges 10 of the U-shaped member 9 and each pin has a vertical arm 16 connected thereto and carrying a flat spring 20, each arm 16 and spring 20 constituting the stabilizing arm of a responsive V-shaped lever. A plate spring 17 is disposed between the axle 4 and the bridge 12 and biases the bridge away from the axle when the vehicle is not loaded.

Thus, each lever constituted by an elongated upright stabilizing arm 16 and a short inclined supporting arm 9 can be considered to be "V-shaped" in that imaginary lines parallel to the lengths of these arms and passing through their pivot axis 11 define a V.

When a load 18 is placed on the vehicle this causes the bridge 12 to be lowered as shown in FIGURE 4, and the arms 16 are tilted toward each other and pressed against the load which they retain on the vehicle in well-balanced fashion. Thus, as the bridge 12 moves downwardly it pulls the links or connecting rods 14 downwardly and moves the inward-most corners of U-shaped members 9 downwardly so that these members 9 can pivot in their bearings 11. Since the arms 16 are mounted in the U-shaped member 9 they thus move inwardly toward each other.

As shown in FIGURE 3 a plank 19 can advantageously be fixed to the sides 1 and arranged parallel to the bridge 12 for indicating the point at which the middle of the load can be disposed. In order to prevent the arms from roughly contacting the load, they are provided at their ends with plate-like spring 20.

When the load comprises several pieces which are successively placed against each other, the arms must remain open until loading is completed. On the other hand, when the arms are pressed against a load they must be prevented from moving away from a load, for example due to the vehicle passing over uneven or irregular surfaces. These two conditions are satisfied by means of a locking device which is constructed of two stirrups 21 fixed to the flanges 13 of the bridge 12 and surrounding the axle. They also include a slide 22 which is retained in position below the axle by guide members 23 fixed to the axle. The slide carries two wedge-shaped elements 24 and two L-shaped members 25. It is actuated by a lever 26 which is fixed to the axle by means of a support 27.

When the arms are open the stirrups abut against the slide which is then operated so that the stubs 25 are disposed under the stirrups 21. This is shown for example in FIGURE 1. When the arms are pressed against the load the stirrups 21 move away from the axle 4, and, by operation of the slide, the wedges 24 are introduced between the axle and the base of the stirrups. This is shown for example in FIGURE 4.

The pins 15 to which the arms 16 are fixed are constructed so that these arms can be pivoted, horizontally, about the axis of pins 15 onto the vehicle when it is to be placed in storage or operated with no load. This pivoting of each arm 16 about the axis of pin 15 is in a direction perpendicular to the direction in which the lever 9, 16 pivots about the axis of bearing 11. In other words, the arms 9 and 16 defining each lever will pivot together about bearing 11, while each stabilizing arm can pivot about the axis of its respective pin 15 when it is desired to lower the stabilizing arms 16 for storing the vehicle. The arms 16 are locked in either a vertical or horizontal position by means of a lock 28 which is shown in FIGURES 5, 6 and 7. The lock includes a sleeve 29 coupled to the pin 15. A rod 30 slides in sleeve 29 and is urged by a spring 31 into one of the holes 32 or 33 formed in the flanges 10 of the U-shaped member 9 depending whether the arm is to be in a vertical or horizontal position. The rod may be unlocked by pulling it by means of a hand grip 34 which is provided for the purpose.

A draft or a pulling bar 35 is provided at its end with a hand grip 38 shown in FIGURE 3 and is fixed to one of the sides of the chassis by a swivel pin 36. It can be seen that because of the swivel pin it can be swiveled to any desired angle. When the pulling bar is not used it can be placed along the side of the chassis and retained by a clamp 37 which is integral with the chassis. When the draft or pulling bar is used it is placed into the position indicated in phantom lines 35' in FIGURE 3 and then its hand grip shown at 38' is disposed in front of the vehicle. The draft or the pulling bar is used for operating the vehicle with no load, and the vehicle when loaded is moved by pushing on the load.

FIGURE 8 illustrates a vehicle bearing a load 18. It can be seen that its arms 16 are upright and its draft bar 35 is tilted back into position alongside the chassis.

As shown in FIGURE 9 the vehicle is operated without any load by using the draft bar 35. When used in this fashion the arms 16 are tilted back to the rest position.

It is advantageous for supports 39 to be provided in order to retain the vehicles in a vertical position when standing upon their two carrying wheels 5 as shown for example in FIGURE 10. The supports are constructed of flat iron members having their ends bent at a right angle in opposite directions. One of the respective ends is fixed to the axle and the other extends upwardly in the vertical plane in a tangent to the carrying wheels. As shown in FIGURES 1 and 3 one of the supports 39 may at the same time also be used as the support 27 for the lever 26 of slide 22.

FIGURE 10 illustrates three vehicles placed vertically against each other for storage purposes.

It can thus be seen that the present invention provides a vehicle with stabilizing arms which are fixed to their respective supports which are the supporting arms. The supporting arms are joined at their ends located near the stabilizing arms. They are supported by a bearing member at the other ends of each of the supporting arms and they support the load by means of a connecting rod connected to a bridge. The support to which the bearings are connected is advantageously one axle of the vehicle.

The workshops and storehouses in which tall, narrow loads which are difficult to balance are to be handled are usually equipped with traveling cranes or tackle. The load is then raised by one of these hoisting apparatus and is then placed on the bridge of the vehicle which connects the ends of the supporting arms. This lowers the bridge and swings the levers about the fulcrums defined by the bearings until the ends of the stabilizing arms press against the vertical sides of the load.

A spring such as a bent plate can advantageously be disposed between the supporting bridge and the support or chassis. This spring urges the supporting bridge upwardly and automatically brings the stabilizing arms into an open position when the load is removed from the vehicle.

The stabilizing arms are preferably connected to the supporting arms by means of a jointed connection which allows them to swivel about the supporting arms and be tilted back horizontally along the chassis of the vehicle when it is not used or is operated without a load. In such event each supporting arm comprises, for example a flat iron member, having its ends folded at a right angle to form a U-shaped member and provides bearings for a swivel pin connected with the stabilizing arm.

It is advantageous to provide the vehicle with a device for retaining the stabilizing arm in open position for receiving the load or in a closed position against the sides of the load. On the other hand, it is also advantageous to provide the vehicle with a device for locking the arms on the supporting arms in a vertical or horizontal position.

The device for retaining the stabilizing arms in an open or closed position includes at least one stirrup which is integral with the supporting bridge and which slides in a vertical direction along the axle which it surrounds. In addition a horizontal slide is provided which can be operated by a lever and retained in position under the axle by guide means. On the one hand, this slide is provided with at least a wedge set between the axle and stirrup or support and this is accomplished by laterally moving the slide. On the other hand, it is provided with at least one stub which is provided under the stirrup or support and to accomplish this move in a direction which is opposite to that in which the slide moves to place the wedges in retaining position. This is performed when the supporting bridge occupies its upper position and when the base of the stirrup lies against the axle.

The device for locking the stabilizing arms on the supporting arm includes a sleeve fixed to each swivel pin of a stabilizing arm and in which a rod slides urged by a spring. It can slide into openings made into one of the bent ends of the supporting arm, and these openings respectively correspond to the vertical position and the horizontal position of the stabilizing arms.

The chassis of the vehicle is preferably in the general shape of a trapezoid of which the larger base is the axle provided with carrying wheels and to which the bearings of the supporting arms are connected. A short axle carrying two guiding wheels in connected to the small base for example by means of a swiveling fork.

A draft or pulling rod is connected to a swivel pin fixed to the front portion of the vehicle. The swivel pin is so oriented that the person operating the vehicle will find the draft bar in the correct lateral position that is, such position that it is disposed where a draft rod is expected to be when a vehicle is to be drawn. Also the draft bar is disposed in a clamp alongside the chassis when it is not used for operating the vehicle. The draft bar is used for towing the vehicle when there is no load. When the vehicle is loaded it is operated by pushing on the load until it forms a unit.

Also, the rear end of the vehicle can have at least one support fixed to it which rests on the floor and retains the vehicle well-balanced when it is set upright on its wheels, for example this could be performed when it is to be stored when not in use.

It will be understood that the above description of the present invention is susceptible to various modifications, changes, and adaptations, and the same are intended to be comprehended within the meaning and range of equivalents of the appended claims.

What is claimed is:

1. A vehicle for carrying tall, narrow objects as loads, comprising, in combination:
    a chassis;
    at least one pair of levers each composed of a normally substantially upright stabilizing arm and a supporting arms;
    at least two bearings, one for each said lever, each bearing being mounted on said chassis and supporting one end of a respective supporting arm for permitting said levers to pivot so that said stabilizing arms pivot toward each other to a stabilizing position and away from each other to a substantially upright position; and
    urging means on said chassis, said urging means including a bridge extending between said levers and having each end pivotally connected to the other end of a respective one of said supporting arms for normally urging the ends of said stabilizing arms away from each other and for pivoting said stabilizing arms toward each other against the sides of a load placed on the vehicle, said urging means moving said stabilizing arms toward each other under the influence of the weight of the load.

2. A vehicle as defined in claim 1 wherein said bridge is disposed over a portion of the chassis and is connected to said supporting arms by connecting links, and said urging means further include a spring between said bridge and said chassis portion for applying a force to said bridge which tends to urge said stabilizing arms away from each other.

3. A vehicle as defined in claim 2 wherein said chassis portion is an axle for the vehicle.

4. A vehicle for carrying tall, narrow objects as loads, comprising, in combination:
    a chassis;
    at least one pair of levers each composed of a normally substantially upright stabilizing arm and a supporting arm, each said lever being connected to said chassis for pivotal movement such that said stabilizing arms pivot toward each other to a stabilizing position and away from each other to a substantially upright position;
    means pivotally connecting each said stabilizing arm with its associated supporting for permitting said stabilizing arm to rotate from a vertical position to a horizontal position in a direction perpendicular to the direction of pivotal movement of said levers with respect to said chassis; and
    urging means on said chassis and connected between said supporting arms of said two levers for normally urging the ends of said stabilizing arms away from each other and for pivoting said stabilizing arms toward each other against the sides of a load placed on the vehicle, said urging means moving said stabilizing arms toward each other under the influence of the weight of the load.

5. A vehicle as defined in claim 4 wherein each supporting arms is a flat iron member having its ends folded at a right to provide a U-shaped member for defining the bearing of a pin, which pin is integral with the corresponding stabilizing arm.

6. A vehicle for carrying tall, narrow objects as loads, comprising, in combination:
    a chassis;
    at least one pair of levers each composed of a normally substantially upright stabilizing arm and a supporting arm, said levers being connected to said chassis for pivotal movement such that said stabilizing arms pivot toward each other to a stabilizing position and away from each other to a substantially upright position;
    urging means on said chassis and connected between said supporting arms of said levers for normally urging the ends of said stabilizing arms away from each other and for pivoting said stabilizing arms toward each other against the sides of a load placed on the vehicle, said urging means moving said stabilizing arms toward each other under the influence of the weight of the load; and
    means for selectively retaining said stabilizing arms in their said stabilizing position or in their said substantially upright position, said retaining means including: a stirrup integral with said urging means and mounted for vertical sliding movement against a portion of the chassis which it surrounds; a horizontal slide mounted to be retained under said chassis portion by guide members, said slide including a set of wedges which may be disposed bettween said chassis portion and the base of said stirrup by laterally moving said slide; a lever for actuating said slide; and an L-shaped stub which is mounted to slide under said stirrup when moved in a direction opposite to the direction for placing said wedges between said chassis portion and the base of said stirrup and when said urging means is in its upper position with the base of said stirrup being disposed against said chassis portion.

7. A vehicle for carrying tall, narrow objects as loads, comprising, in combination:
    a chassis;
    at least one pair of levers each composed of a normally substantially upright stabilizing arm and a supporting arm, said levers being connected to said chassis for pivotal movement such that said stabilizing arms pivot toward each other to a stabilizing position and away from each other to a substantially upright position;

urging means on said chassis and connected between said supporting arms for normally urging the ends of said stabilizing arms away from each other and for pivoting said stabilizing arms toward each other against the sides of a load placed on the vehicle, said urging means moving said stabilizing arms toward each other under the influence of the weight of the load; and locking means for locking each of said stabilizing arms selectively in either a vertical or a horizontal position with respect to its associated supporting arm, said locking means including, for each said lever: a journal pin integral with its associated stabilizing arm; a sleeve fixed to said journal pin; and a rod disposed in said sleeve and spring-biased into openings provided in said associated supporting arm, which openings respectively correspond to the vertical position and to the horizontal position of said stabilizing arm.

8. A vehicle for carrying tall, narrow objects as loads, comprising, in combination:

a chassis in the form of a trapezoid whose larger base defines an axle, carrying wheels disposed at the ends of said axle, at least one pair of bearings fixed to said larger base, and at least one swiveling guiding wheel connected to the small base of the trapezoid; at least one pair of levers each composed of a normally substantially upright stabilizing arm and a supporting arm, each said lever being pivotally mounted on a respective one of said bearings for pivotal movement such that said stabilizing arms pivot toward each other to a stabilizing position and away from each other to a substantially upright position; and urging means on said chassis and connected between said supporting arms for normally urging the ends of said stabilizing arms away from each other and for pivoting said stabilizing arms toward each other against the sides of a load placed on the vehicle, said urging means moving said stabilizing arms toward each other under the influence of the weight of the load.

References Cited

UNITED STATES PATENTS

| | | | |
|---|---|---|---|
| 912,190 | 2/1909 | Shotwell | 280—144 |
| 1,103,986 | 7/1914 | Cobb | 280—47 |
| 1,657,115 | 1/1928 | Fischer | 280—36 |
| 2,588,732 | 7/1948 | Kemp | 214—10.5 |
| 2,820,643 | 1/1958 | Cohn | 280—47.27 X |
| 2,893,330 | 7/1959 | Johnson | 280—143 X |

LEO FRIAGLIA, *Primary Examiner.*

BENJAMIN HERSH, *Examiner.*

E. GOODMAN, *Assistant Examiner.*